(12) United States Patent
Smith et al.

(10) Patent No.: US 7,440,653 B2
(45) Date of Patent: Oct. 21, 2008

(54) FABRICATION OF WAVEGUIDES AND BRAGG GRATINGS WITH UV-IRRADIATION

(75) Inventors: Peter George Robin Smith, Hampshire (GB); Richard Bird Williams, Hampshire (GB); Vassilios Albanis, Hampshire (GB); Corin Barry Edmund Gawith, Hampshire (GB); Samuel Paul Watts, Hampshire (GB); Gregory Daniel Emmerson, Hampshire (GB)

(73) Assignee: University of Southampton, Hampshire (GB)

(*) Notice: Subject to any disclaimer, the term of this patent is extended or adjusted under 35 U.S.C. 154(b) by 38 days.

(21) Appl. No.: 10/535,010

(22) PCT Filed: May 19, 2003

(86) PCT No.: PCT/GB03/02141

§ 371 (c)(1),
(2), (4) Date: May 31, 2005

(87) PCT Pub. No.: WO2004/049024

PCT Pub. Date: Jun. 10, 2004

(65) Prior Publication Data

US 2006/0127024 A1    Jun. 15, 2006

(30) Foreign Application Priority Data

Nov. 28, 2002  (GB) ................. 0227803.4

(51) Int. Cl.
G02B 6/10 (2006.01)
G02B 6/34 (2006.01)
C03B 37/022 (2006.01)
(52) U.S. Cl. ............. 385/37; 385/132; 65/386
(58) Field of Classification Search .......... 385/37, 385/132; 65/386
See application file for complete search history.

(56) References Cited

U.S. PATENT DOCUMENTS 5,066,133 A * 11/1991 Brienza ............... 359/570

(Continued)

FOREIGN PATENT DOCUMENTS

EP  0909963  4/1999

(Continued)

OTHER PUBLICATIONS

Emmerson, G.D. et al. "Fabrication of directly UV-written channel waveguides with simultaneously defined integral Bragg gratings." *Electronics Letters*. 38.24 (2002):1531-1532.

(Continued)

*Primary Examiner*—M. R. Connelly-Cushwa
*Assistant Examiner*—Jerry T Rahll
(74) *Attorney, Agent, or Firm*—Renner, Otto, Boisselle, Sklar, LLP.

(57) ABSTRACT

A method of simultaneously defining a waveguide and grating in a sample of photosensitive material comprises providing a sample of material (24) having a region which is photosensitive to light of a specific wavelength, generating a spot of light (22) at the specific wavelength, the spot having a periodic intensity pattern of high and low intensity fringes, and a width which is related to the width of the channel, positioning the spot within the photosensitive region and causing relative movement between the sample and the light spot along the desired path of the waveguide/grating define a channel of altered refractive index by exposing parts of the photosensitive region to the light spot. Modulation of the light spot to produce multiple exposures produces a grating, while continuous exposure results in a uniform waveguide. These structures can be written in straight lines or around curves, and can be accurately overwritten, so that complex optical devices can be produced in a single fabrication step.

20 Claims, 8 Drawing Sheets

U.S. PATENT DOCUMENTS

| | | | |
|---|---|---|---|
| 5,818,988 A * | 10/1998 | Modavis | 385/37 |
| 5,896,484 A | 4/1999 | Borrelli et al. | |
| 6,221,566 B1 * | 4/2001 | Kohnke et al. | 430/321 |
| 6,229,938 B1 | 5/2001 | Hibino et al. | |
| 6,438,293 B1 | 8/2002 | Eldada et al. | |
| 6,549,705 B1 * | 4/2003 | Laming et al. | 385/37 |
| 6,573,026 B1 * | 6/2003 | Aitken et al. | 430/290 |

FOREIGN PATENT DOCUMENTS

| | | |
|---|---|---|
| GB | 2308461 | 6/1997 |
| JP | 03214109 | 9/1991 |
| JP | 2002022917 | 1/2002 |
| JP | 2002311277 | 10/2002 |
| WO | 02/44780 | 6/2002 |
| WO | 02/071113 | 9/2002 |

OTHER PUBLICATIONS

Svalgaard, M. "Direct writing of planar waveguide power splitters and directional couplers using a focused ultraviolet laser beam." *Electronics Letters*. 33.20 (1997): 1694-1695.

Park Mahn Yong et al. "Fabrication of low-cost planar wavelength-selective optical add-drop multiplexer by employing UV photosensitivity." *Electronics Letters*. 38.24 (2002): 1532-1533.

Bonar, J.R. et al. "Low threshold Nd-doped silica planar waveguide laser." *Electronics Letters*. 30.3 (1994): 229-231.

Hill, Kenneth O. et al. "Fiber Bragg Granting Technology Fundamentals and Overview." *Journal of Lightwave Technology*. 15.8 (1999): 1263-1276.

Svalgaard, M. et al. "Directly UV written silica-on-silicon planar waveguides with low loss." *Electronics Letters*. 33.10 (1997): 861-863.

Gaff, K.W. et al. "Two-wavelength planar add/drop WDM filter employing a three-mode coupling Bragg grating." *Electronics Letters*. 36.13 (2000):1143-1145.

Iino, Akira et al. "Mechanisms of Hydrogen-Induced Losses in Silicia-Based Optical Fibers." *Journal of Lightwave Technology*. 8.11 (1990): 1675-1679.

Atkins, R.M. et al. "Effects of elevated temperature hydrogen exposure on short-wavelength optical losses and defect concentrations in germanosilicate optical fibers." *Journal of Applied Physics*. 72.2 (1992): 344-348.

* cited by examiner

FABRICATION OF WAVEGUIDES AND BRAGG GRATINGS WITH UV-IRRADIATION

This application is a national phase of International Application No. PCT/GB2002/002141 filed May 19, 2003 and published in the English language.

BACKGROUND OF THE INVENTION

The present invention relates to the fabrication of waveguide structures containing Bragg gratings.

Optical fibres have an optical waveguiding function defined by a high refractive index core surrounded by a lower refractive index cladding. Further functionality is available by writing grating structures, known as Bragg gratings, into the core. These structures comprise a series of grating planes of alternating high and low refractive index, and give a spectral reflection/transmission response which depends on the periodicity of the grating planes. These gratings can be used to create a wide range of fibre-based optical devices for applications including dispersion compensation, optical feedback and wavelength multiplexing.

Conventionally, fibre Bragg gratings are fabricated by exposing fibre to ultraviolet (UV) light so as to induce a refractive index modification in photosensitive material in the fibre core. This technique is dependent on the ability to create a predetermined pattern of exposed and unexposed regions of material, to give the desired periodic variation of refractive index. To achieve this periodicity, a common method is the use of an interference fringe pattern of UV light generated with a phase mask or two interfering beams. Exposure to bright fringes in the pattern causes a local increase in refractive index, whereas the dark fringes produce little or no change. Grating fabrication is typically performed by exposing a fibre from the side to the UV interference pattern, where the fibre has a waveguiding core doped with germanium to provide the required photosensitivity. The pattern is of a size much larger than the core width [1].

Phase masks are a well-established way of providing the required intensity pattern, which is formed as a large, elongate UV spot. This allows relatively long lengths of fibre to be exposed with an interference pattern containing hundreds of fringes, to give hundreds of grating planes. The pattern can be stepped along the fibre to give overlapping exposures so that each grating plane is exposed many times, which averages out any errors arising from instability of the writing system or imperfections in the mask. The physical definition of the mask limits the range of grating periods which can be achieved, but this can be improved by using wavelength detuning, in which the stepped exposures are achieved by pulsing at a period different from the period of the interference pattern This technique can also be used to create apodised and chirped gratings having a tailored spectral response.

An alternative method of generating a fringe pattern is to interfere two millimeter-scale LW beams by intersecting them at an appropriate angle. Alteration of the intersection angle changes the period of the fringes, so that Bragg gratings with a wide range of spectral responses can be readily produced. Also, the polarisation of the beams can be controlled to influence the contrast of the fringes, and the birefringence. Apodised and chirped gratings written using wavelength detuning can be produced from patterns of this kind.

Optical waveguiding can also be performed using planar waveguide structures. These are devices in which waveguiding is provided in one dimension by sandwiching a layer of high refractive index material between two lower refractive index layers. In the orthogonal dimension, a channel of high index material is defined from the layer by one of various channel writing techniques. These include reactive ion etching, ion exchange, and UV writing with a high intensity focussed spot in a photosensitive waveguiding layer.

The provision of Bragg gratings in such planar waveguide structures is desirable, because many of the diverse range of complex optical devices already available in an optical fibre format can thereby be densely integrated into a single robust waveguide chip. However, it has been found difficult to realise and optimise both the channel waveguiding core and the Bragg grating superstructure when defined in the same host substrate material.

The aforementioned techniques of writing gratings into fibres by UV exposure with an interference pattern have been applied to planar waveguide channels comprising photosensitive material [2, 3, 4]. However, the resulting devices are difficult and costly to produce. Also, the grating quality has been found to be poor and the spectral response of the grating is difficult to tailor, so applications of the resulting device are limited.

A particular problem arises from the need to have a very uniform effective refractive index along the length of the waveguiding channel, so as to give a grating with a non-varying reflection peak. However, the effective index of the guided mode depends strongly on the channel dimensions, which are difficult to control accurately when defining the channel by lithography and etching techniques.

If a UV channel writing technique is used, most of the photosensitivity of the waveguiding layer is used up in defining the refractive index difference between the channel and the remainder of the layer, so that there is little refractive index change available for creating sufficiently strong Bragg gratings via exposure to a UV interference pattern.

Hence, there is a need for an improved method of fabricating planar waveguides having Bragg gratings.

SUMMARY OF THE INVENTION

Accordingly, the present invention is directed to a method of writing a waveguiding channel of increased refractive index into a sample, the channel having a width and a path, the method comprising:

providing a sample of material having a region which is photosensitive to light of a specific wavelength;

generating a spot of light at the specific wavelength, the spot having a periodic intensity pattern of high and low intensity fringes, and a width which is related to the width of the channel;

positioning the spot within the photosensitive region; and causing relative movement between the sample and the light spot along the path of the channel to define the channel by exposing parts of the photosensitive region to the light spot to produce a change in refractive index.

The method allows simultaneous definition of waveguides and gratings in a single fabrication step. Adjustments can be made to many characteristics including waveguide and grating strength, grating length and position along the waveguide, and grating period, by altering the exposure, the relative movement, the intensity of the light spot and the period of the fringe pattern. Hence, a wide variety of optical waveguide devices can be quickly and simply made.

A simple waveguide portion can be written if the relative movement is at a constant velocity and exposure to the light spot is continuous during the relative movement to produce a uniform change in refractive index.

A grating can be written if exposure to the light spot is discontinuous during the relative movement to produce a periodic change in refractive index along the channel, the periodic increase defining a Bragg grating.

Switching between the two regimes as the path of the channel is traced out through the photosensitive region allows a complex waveguiding structure to be created, with gratings formed integrally within the waveguiding channel. This avoids alignment problems associated with two-step prior art techniques in which a waveguide is written first and a grating subsequently imposed over the top. According to the invention, any grating is always created in full alignment with the waveguide by definition, so that there is optimum overlap between the grating and the optical mode of the waveguide. Thus the grating efficiency is improved.

The ability to fabricate complex optical devices in this way confers great benefits. High quality gratings can be integrated into any waveguiding channel structure as desired, so that the manufacture of integrated optic devices is greatly simplified. The prior art requirements for non-trivial steps such as lithography, etching, phase mask manufacture and alignment are eliminated, making the method more flexible, less costly and simpler to implement than techniques currently in use.

A further advantage is that the problem of loss of photosensitivity associated with prior art two-step UV writing techniques is addressed. If a uniform waveguide channel is written with a UV beam, there can be little photosensitivity left for any further UV writing, so that it is only possible to form a very weak grating. The present method overcomes this, by using the same writing step and writing beam to form both uniform and grating sections, so that the grating does not have to be overwritten into a region of reduced photosensitivity.

The discontinuous exposure may comprise a plurality of adjacent exposures along the path of the channel, and preferably, the adjacent exposures overlap such that in each exposure at least one high intensity fringe in the light spot exposes a part of the photosensitive region already exposed to a high intensity fringe in a previous exposure. This averages out any fluctuations in light spot intensity or small errors in relative movement or positioning of the light spot, so that all planes in the grating are formed by a substantially equal refractive index change, giving an improved grating performance.

In one embodiment, each adjacent exposure is offset from exact overlap so that resulting periodic increase in refractive index has a different period from the periodic intensity pattern of the light spot. This is a simple way of writing several gratings with different periods during the same writing process, because no physical adjustment needs to be made to the writing apparatus. Instead, the exposure repetition rate and the relative movement can be controlled so as to provide the appropriate overlap; this is advantageously done by using computer control. A fully automated writing method is thus provided, in which a suitable computer program can be provided to control the writing apparatus so as to fabricate any desired waveguiding structure.

The flexibility can be further increased if the offsets are arranged such that the period of the periodic increase in refractive index varies so as to define a chirped or apodised Bragg grating, or a Bragg grating containing arbitrary phase shifts. A waveguiding device comprising standard, chirped, apodised or arbitrary phase shift gratings can thus be written in a one step. This is especially beneficial if performed using computer control, as a very precise and accurate device can be fabricated.

In one embodiment, the relative movement is arranged to be non-perpendicular to the periodic intensity pattern so as to define a tilted grating. This can be readily achieved by use of a suitable translation stage to provide the relative movement. The same apparatus can be therefore used to write tilted and non-tilted gratings, and both types of grating can be written into a single waveguiding structure in a single fabrication step. Tilted gratings can be used to direct light, or to reduce back reflections.

In an advantageous embodiment, the light spot is substantially circular. Thus, the spot is smaller than the large and/or elongated patterns used to write gratings according to the teaching of the prior art, and hence contains fewer fringes. This is advantageous in that rapid changes in the phase properties of a grating can be achieved over very small distances, because the grating is built up in shorter sections. This is of particular benefit in applications such as phase encoding and gratings containing phase shifts. The use of fewer fringes may suggest that the averaging benefits of multiple overlapping exposures as described above is limited, because each grating plane will be overwritten typically about ten times instead of hundreds of times as occurs with a large spot However, results to date have indicated that high quality gratings can be achieved with the low amount of averaging. This is a surprising result, as it contradicts the general opinion in the art that sufficiently high quality gratings with few phase errors can only be achieved using large spots with many fringes, and hence many overlapping exposures. Of course, the use of such large spots is wholly incompatible with simultaneous waveguide and grating writing, because the spot size believed to be required for the grating far exceeds the dimensions of any desired waveguide channel.

A further advantage of a circular spot is that it allows curved waveguides and gratings to be written with much finer detail and accuracy than can be achieved using a conventional elongated fringe pattern. Thus, the range of devices which can be fabricated using UV writing is increased.

Therefore, the path of the channel may be substantially linear, or may comprise one or more curves. Additionally, the path of the channel may comprise two or more interconnecting portions. This allows complex waveguiding devices to be written, such as Mach-Zehnder interferometer structures.

The light spot may be generated by intersecting two beams of light at an angle to form an interference pattern, or alternatively by exposure through a phase mask.

Possibly, the low intensity fringes of the light spot have an intensity greater than zero. This assists in providing waveguiding properties for section of grating, because the low refractive index planes of the gratings are given a slight refractive index increase over the surrounding photosensitive material.

Also, the light spot may be generated from polarised light, and the polarisation may be controlled to modify the change in refractive index. This modification can be used to vary the contrast of the grating fringes, i.e. the ratio of the refractive indices of the high and low index planes. Also, the birefringence of the waveguide can be altered by this technique.

The method may further comprise repeating the positioning of the spot and the causing of relative movement so as to define one or more additional channels with paths substantially the same as the path of the said channel. This feature allows gratings and/or uniform waveguides to be written over previous structures, so that the complexity of the devices that can be fabricated is further increased. Use of computer control enhances this feature, because highly accurate repositioning of the sample can be achieved.

The photosensitive region may be loaded with hydrogen and/or deuterium to enhance the photosensitivity. The hydrogen and/or deuterium may be locked into the sample. Alternatively, the method may further comprise subjecting the sample to a loading process to load hydrogen and/or deuterium into the photosensitive region, before exposure of the sample to the light spot, and may additionally further comprise, after the loading process, subjecting the sample to a thermal locking process to lock the hydrogen and/or deuterium into the photosensitive region, before exposure of the sample to the light spot Loading and locking improves the photosensitivity of the photosensitive region, so that a greater increase in refractive index can be induced, or a weaker light spot can be used.

BRIEF DESCRIPTION OF THE DRAWINGS

For a better understanding of the invention and to show how the same may be carried into effect reference is now made by way of example to the accompanying drawings in which:

FIG. 2 shows an end view of a sample of material suitable for use in embodiments of the invention;

DETAILED DESCRIPTION

When photosensitive material is exposed to ultraviolet light, its refractive index is permanently altered. The alteration can be an increase or decrease. In materials such as germanosilica, an increase is created except at the highest levels of ultraviolet fluence. This effect can be used to define a waveguiding channel within a sample of material, by tracing out a desired path with an intense spot of ultraviolet light to create a channel of material having a greater refractive index than the surrounding material. Optical gratings (Bragg gratings), comprising an array of planes of high and low refractive index material, can be similarly created by exposing the photosensitive material to a pattern of light having fringes of high and low intensity, so that high intensity parts of the pattern produce planes of high index material. The present invention combines these techniques to permit simultaneous writing of waveguide channels and gratings within the channels.

First Embodiment

Figure 1:
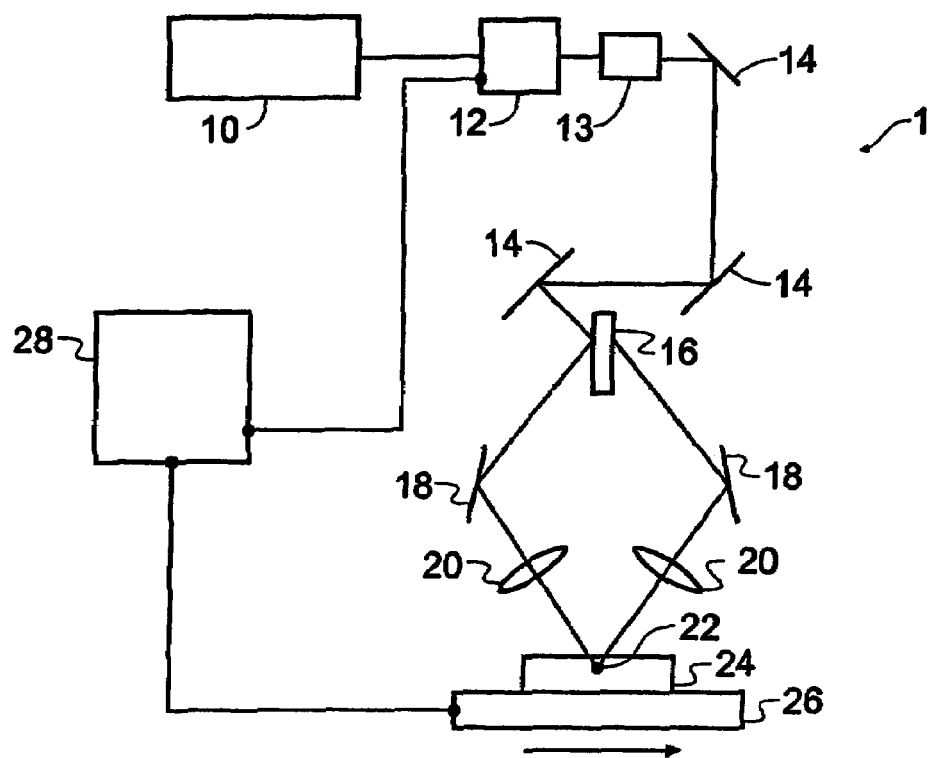
FIG. 1 shows a schematic diagram of apparatus suitable for carrying out embodiments of the invention.

FIG. 1 shows a schematic depiction of apparatus 1 suitable for carrying out methods according to embodiments of the present invention. The apparatus comprises a laser system 10 operable to generate ultraviolet light, for example a continuous wave argon-ion laser with a frequency-doubled output at 244 nm. The output beam of the laser system 10 passes through an acousto-optic modulator 12, operable to modulate or strobe the beam so as to form pulses of light. A spatial filter 13 is positioned after the modulator to improve beam quality. The beam is then steered using a series of mirrors 14 to a beam splitter 16, which splits the beam into two equal parts, each following its own path. Further, independently movable, mirrors 18 redirect the two parts of the beam through focussing lenses 20 so that the parts overlap at an intersection, and interfere to form an interference pattern comprising a spot of light 22 having a periodic series of bright and dark intensity fringes. The period of the fringes is governed by the angle of intersection, which can be adjusted via the mirrors 18. The focussed beams can be steered through reference pinholes (not shown) of an appropriate size to ensure that the intersection occurs at the beam waists.

A sample of material 24 into which a waveguiding channel is to be written is arranged such that the light spot 22 is positioned within a region of photosensitivity within the sample 24. The sample 24 is supported on a linear translation stage 26 which is operable to move the sample 24 with respect to the light spot 22, so that the spot 22 moves through the photosensitive region and causes a refractive index increase in a desired configuration. A control unit 28, such as a computer processor, is connected to the translation stage 26 and to the acousto-optic modulator 12, and permits the pulsed output of light to be synchronised with movements of the translation stage 26 and hence the sample 24. Alternatively or additionally, the control unit 28 may comprise an interferometer, such as those available from Zygo Corporation, Middlefield, Conn., USA. This provides highly accurate measurements of the position of the translation stage 26, which are used to control the acousto-optic modulator 12, giving precise positional control and hence high grating and channel quality.

Figures 2A, 2B:
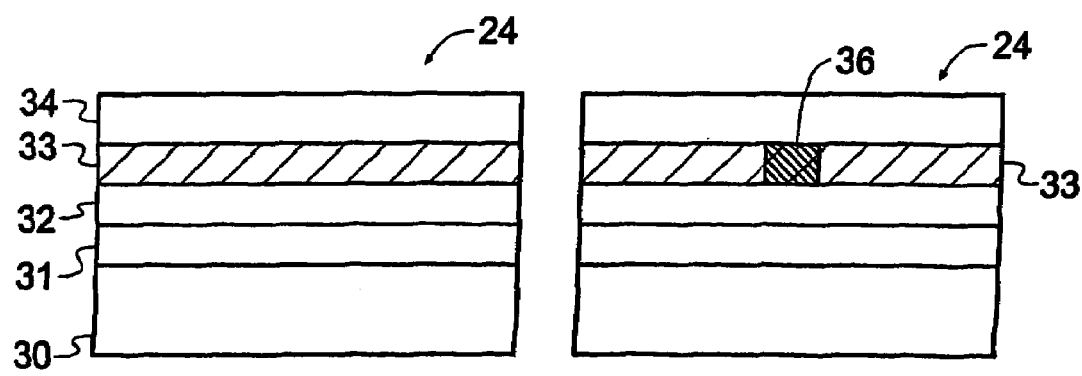
FIG. 2(a) shows an end view of a sample of material comprising a waveguiding structure such as may be fabricated using embodiments of the invention.

FIG. 2(a) shows an example sample 24 in more detail. It has a five-layer structure. The substrate is fabricated on a silicon wafer 30, approximately 1 mm in thickness. On this wafer a thermal oxide layer 31 of thickness 2-10 μm is grown by high temperature steam oxidation. Then an underclad 32 is grown. This can be done by any suitable technique, such as flame hydrolysis deposition. In this example, the underclad 32 is doped with phosphorus, boron, and possibly a low level of germanium to allow the underclad 32 to consolidate at a temperature below that of the melting point of the silicon wafer 30. The underclad 32 has a thickness of 6-20 μm and has the effect of keeping the optical field in the waveguide away from the silicon wafer 30. A core 33 of thickness 4-10 μm is fabricated over the underclad 32. The core has dopants, including high levels of germanium (2-15 mol %) to provide high photosensitivity. Alternative photosensitising dopants such as tin can also be used Finally, an overclad 34 is deposited over the core 33, also having dopants, including possibly low levels of germanium. It is approximately index-matched to the underclad 32. The underclad, core and overclad layers are preferably designed so that the consolidation temperature is lower for each successive layer, so that the layers can be consolidated one after the other without remelting the underlying layers. Hence the overclad 42 has the lowest consolidation temperature.

The small amount of germanium that may be present in the overclad 34 and the underclad 32 is used to allow successful consolidation or to match refractive indices. It tends to slightly extend any refractive index structure written by UV exposure. However, provided the concentration is low the waveguide quality will be acceptable.

The germanium in the core 33 serves two purposes. Firstly, it increases the refractive index of the silica, so the core 33 has a higher refractive index than the overclad 34 and the underclad 32. This gives light-confining, waveguiding properties to the core 33. Secondly, the germanium makes the silica photosensitive, so that its refractive index can be further increased by exposure to ultraviolet light. Thus, if an intense focussed spot of ultraviolet light is directed onto the core 33 and moved therethrough, a channel of material is formed (written) which has a higher refractive index than both the material above and below it (overclad 34 and underclad 32) and the material on either side of it (unexposed parts of the core 33). FIG. 2(b) shows an end view of a sample 24 in which such a channel 36 has been written.

Alternatively, samples can be used in which the core layer 33 has the same refractive index as the overclad 34 and underclad 32 before UV writing. This can be achieved by adding boron and/or fluorine to the core layer 33, or adding phosphorous to the clad layers 32, 34, or both. By making the core 33 have the same index as the clad layers 32, 34 before writing, the subsequently written waveguide will be symmetric, and it is easier to get good index matching to a fibre mode and numerical aperture when integrating the waveguide with other components. In a further alternative, the core 33 may initially have a lower index that the clad layers 32, 34.

In some embodiments of the invention, the photosensitivity of the germanium-doped silica core layer 33 is increased by loading the material with deuterium or hydrogen, which diffuses into the germanium-silica matrix. This can enhance the photosensitivity by a factor of ~100. The loading can be improved by subjecting the sample to thermal locking (or other locking methods). Outdiffusion of the deuterium at room temperature will occur naturally in around 20 minutes to a few hours for a sample loaded at high pressure. The enhanced photosensitivity relies on the presence of the deuterium or hydrogen, so loaded samples must be written quickly, or kept at low temperature during writing to slow the outdiffusion. Thermal locking has the effect of making the photosensitivity persist for much longer periods, typically days, weeks or months. Most of the hydrogen or deuterium will outdiffuse rapidly at the high temperatures used for locking, but what remains gives persistent photosensitivity. These aspects will be discussed in greater detail later.

To implement embodiments of the present invention using the apparatus of FIG. 1, the sample is firstly positioned at the correct height, so that the light spot 22 is focussed within the photosensitive core layer or region 33. In theory, the width of the focussed spot, as defined by its $1/e^2$ intensity, is arranged to be equal to the desired width of the channel, so that a refractive index change of the appropriate size can be created. However, in practice, the actual width of the resulting channel may differ from the spot size. This is typically due to several factors, including the response index to UV writing which can be affected by saturation, the presence of scattering outside the spot causing additional refractive index increase, and heating in the channel region diffusing into surrounding areas. Hence, it is generally necessary to take these factors into account to determine how the spot size should be related to the channel width to produce a channel of the desired width.

Then, using the translation stage, the sample 24 is moved with respect to the spot 22 while being maintained at the correct height, so that the spot 22 traces a path through the photosensitive region and forms the waveguiding channel. The channel is defined as a region having a generally greater refractive index than the surrounding material. In the context of the present invention, this is achieved in one of two ways.

Firstly, a uniform channel waveguide structure having a constant and uniform refractive index value can be written by maintaining the light spot at a constant intensity and translating the sample at a constant velocity. The effect of the fringes in the light spot, which when static form a series of planes of high and low refractive index, is averaged out by the continuous motion and exposure so that a constant and uniform change in refractive index is created. Thus, a waveguiding channel is formed within the photosensitive region which has a width the same as that of the light spot.

Secondly, a Bragg grating comprising a series of planes of high and low refractive index can be written using the same apparatus and the same light spot. To do this, a series of adjacent exposures of the light spot are used to expose successive small portions of the photosensitive region along the desired path of the grating/waveguide. This can be performed by moving the sample in steps, and exposing the sample for a short time for each step, to build up the grating. An improved grating quality can be achieved by changing the relative position of the spot and sample by the separation of adjacent bright fringes between each exposure. Each grating plane is thus formed by many overlapping exposures, which averages out any minor errors in positioning or fluctuations in intensity. If the fringe pattern of the light spot 22 is arranged such that the dark fringes have a non-zero intensity, the low refractive index planes of the grating are formed with a refractive index slightly higher than that of the surrounding material, so that a grating within a waveguide channel is written in a single process. Alternatively, a weak waveguiding channel can be written first, using continuous motion and exposure at a low intensity, and a grating written over the top afterwards using a higher intensity of UV light The controller 28, preferably including an interferometer, is used to control this process. The interferometer measures the position of the translation stage, which is fed to the controller 28. In response to this, the controller moves the control stage by an appropriate amount between exposures, and also operates the acousto-optic modulator in synchronism with the movement, so that a pulse of light is generated to give each exposure when the sample is in the correct position. This is preferably achieved by using a light intensity high enough to induce a sufficient change in refractive index from a very short exposure (short pulse duration), and arranging the motion of the sample to be continuous at a constant velocity, with exposures made as the appropriate part of the sample passes under the light spot.

This technique produces a high quality grating having a width equal to that of the light spot, and hence also equal to that of any waveguide channel written using the same spot. Therefore, a complex waveguiding structure containing one or more integral gratings can be written in a single simultaneous writing step, by changing from continuous to pulsed exposure at appropriate times as the path of the structure is traced out through the sample. Any alignment difficulties arising from creating the channel and the grating in two separate steps according to prior art methods are avoided.

Figure 3:
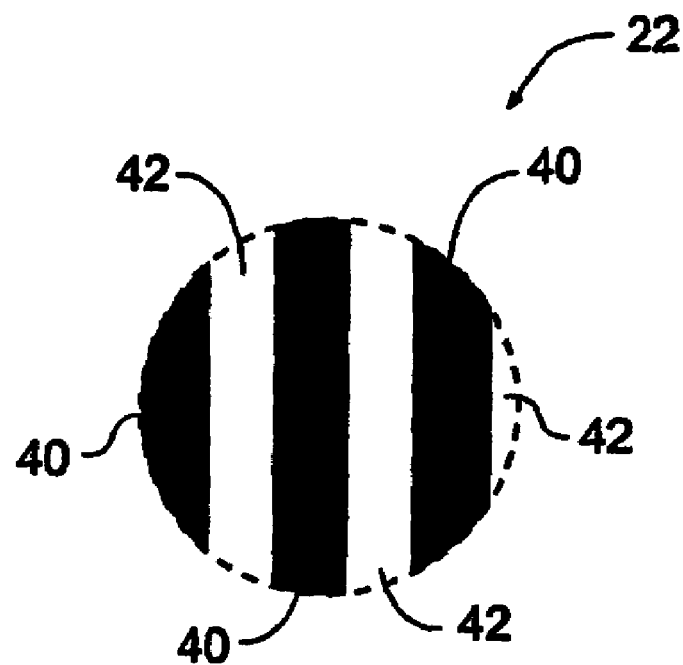
FIG. 3 shows a light spot with a pattern of light and dark fringes generated in accordance embodiments of the invention.
Figure 4:
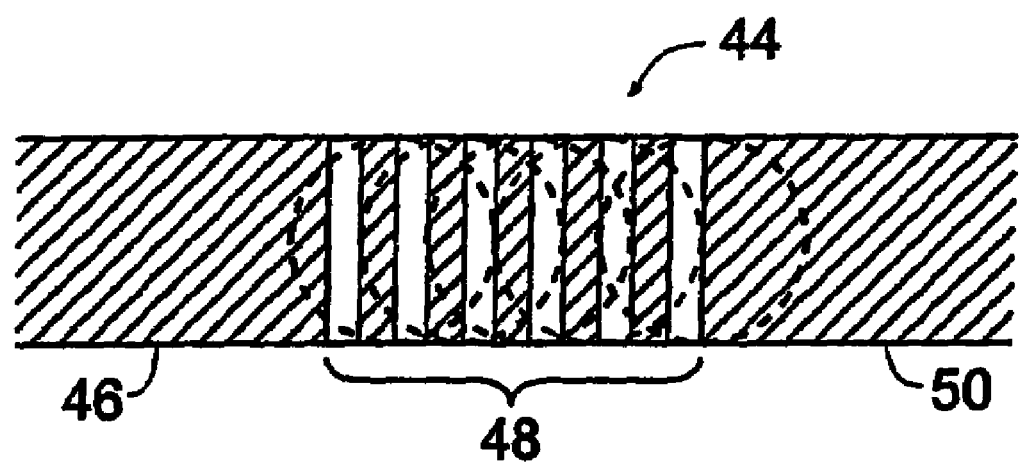
FIG. 4 shows a waveguiding channel comprising uniform and grating sections fabricated using embodiments of the invention.

FIGS. 3 and 4 illustrate, in a simplified form, how such a structure is achieved. FIG. 3 shows a light spot 22 having three high intensity (bright) fringes 40 and three low intensity (dark) fringes 42. FIG. 4 shows a waveguiding structure 44 written with this spot Continuous exposure to the light spot while the sample moves at a constant velocity gives a first section of uniform waveguide 46. Then, a grating 48 is formed using a series of overlapping discrete exposures, each exposure being one bright fringe further along than the previous exposure. Finally, continuous exposure is resumed to write a second section of uniform waveguide 50.

Experimental Results

Waveguide/grating structures of this type have been written into samples having the structure described with respect to FIG. 2(a). The samples were fabricated using flame hydrolysis deposition (FHD). Some samples were photosensitivity enhanced by loading the germanium-doped photosensitive layers with deuterium, which was thermally locked into the samples. Both enhanced and unenhanced samples have been successfully used.

Figure 5A:
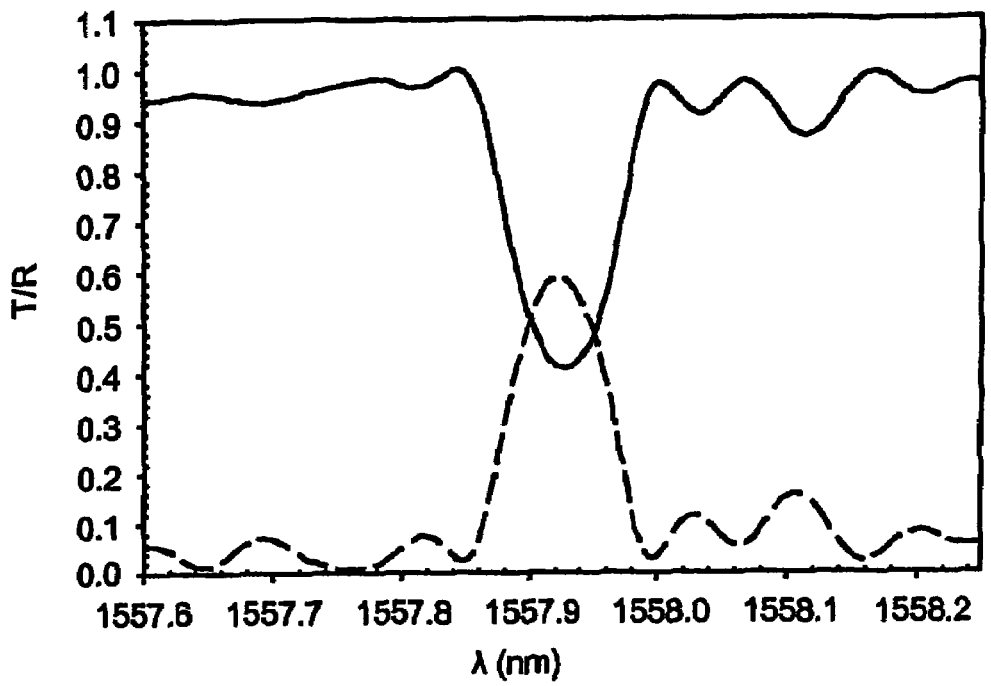
FIG. 5(a) shows the measured spectral response of a first Bragg grating fabricated in accordance with an embodiment of the invention.

In some cases, the light spot was generated with an intersection angle of 22.5°, and focussing of the beams with lenses to a $1/e^2$ spot size of 6 µm The light was generated using a frequency-doubled argon-ion laser giving a continuous wave output with a wavelength of 244 mm. This gave an interference pattern with a fringe period of 552.8 nm FIG. 5(a) shows a typical measured response from one of the Bragg gratings formed in this way, as a graph of wavelength X against transmission T (solid line) and reflection R (broken line). The sample was thermally locked. From this, it can be seen that a relatively well-defined grating has been formed, having a reflectivity of ~60% and a bandwidth of ~0.14 nm for a grating length of 10 mm. It is expected that the grating parameters can be further optimised, but the production of relatively clean grating responses from an unoptimised structure suggests that any phase errors present within the grating are insignificant and do not degrade performance, and that the stepping of the spot along the sample was performed with good accuracy, despite the small spot size.

Figure 5B:
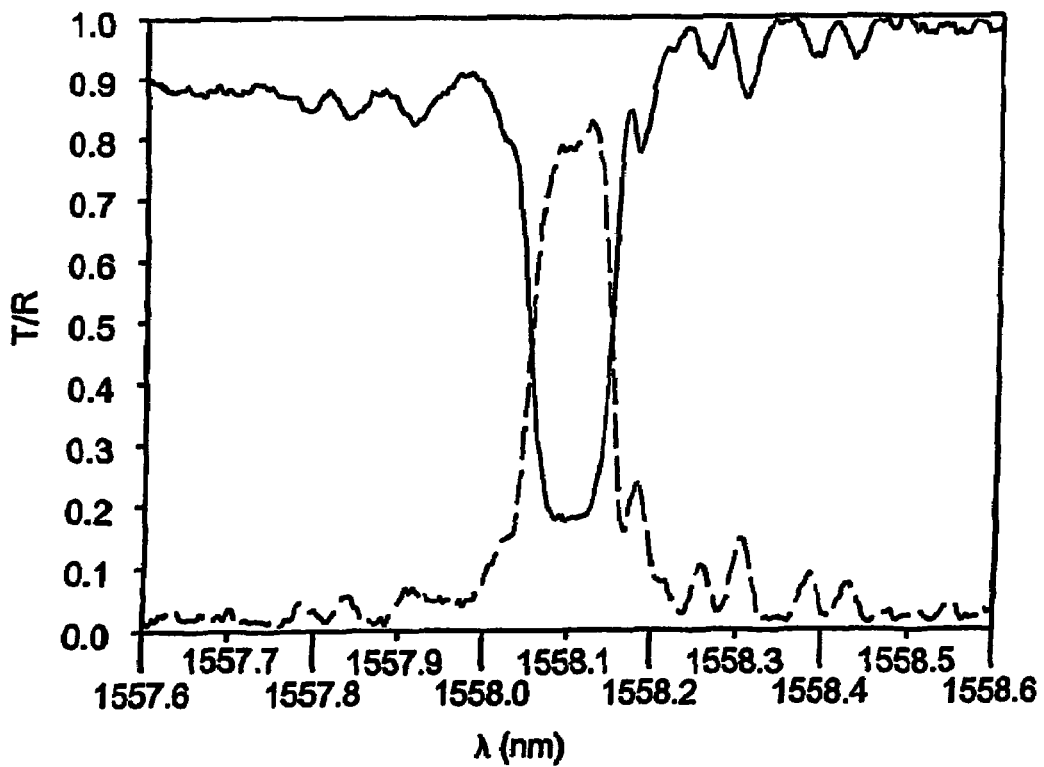
FIG. 5(b) shows the measured spectral response of a second Bragg grating fabricated in accordance with an embodiment of the invention.

FIG. 5(b) shows a similar measured response from an alternative grating, also written in a thermally locked sample. In this case, the reflectivity is ~80%.

Figure 6A:
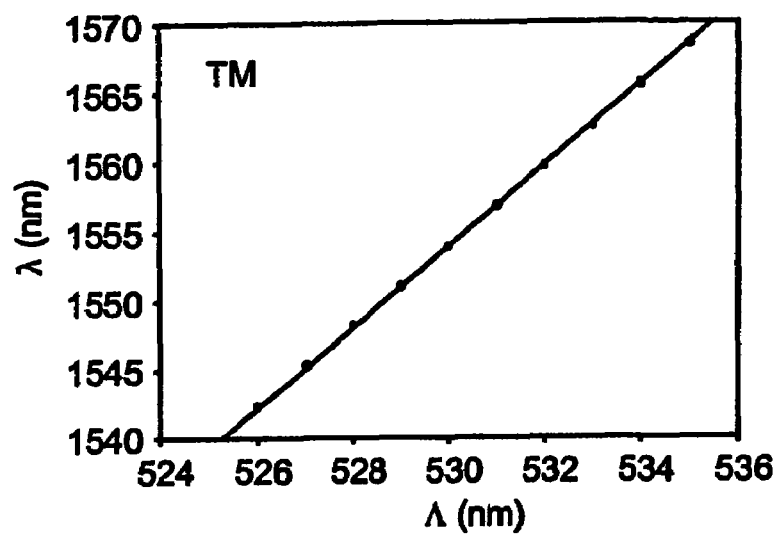
FIGS. 6(a) and 6(b) shows the peak reflectivities of a series of Bragg gratings fabricated in accordance with embodiments of the invention, measured with differently polarised light.
Figure 6B:
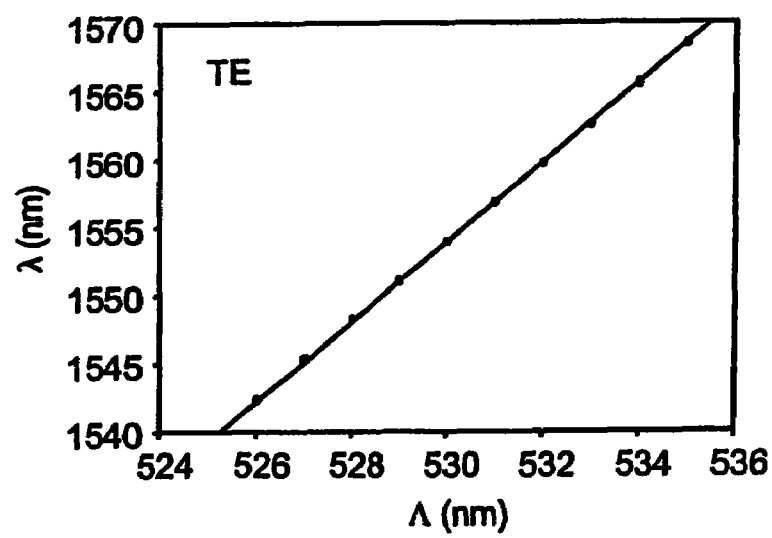

The fringe period in the light spot directly determines the period of the Bragg grating, and hence its wavelength response. The fringe period may be modified by altering the intersection angle used to generate the light spot. FIGS. 6(a) and 6(b) show results of such modification, as graphs of the peak reflected wavelength λ for gratings produced using various fringe periods Λ in non-deuterium loaded samples, and characterised using different polarisations (TM and TE). The linear relationship indicates that the period of the Bragg gratings follows the linear variation in the length of sample translated between exposures, thereby giving full control over the grating period. A wide range of grating periods is therefore readily available by simple realignment of the two interfering beams to a different angle of intersection. Comparison of the responses for the two polarisations indicates a grating birefringence of $3 \times 10^{-5}$.

The amount of refractive index change induced depends on the intensity (or fluence) of the light spot used to write the grating. In the case of a Bragg grating, a higher change gives an increased refractive index difference between the high and low index planes, which determines the strength of the grating. For a waveguiding channel, a high change gives a high effective modal index, $n_{eff}$ and hence a strong waveguide. These factors can be controlled independently by altering the intensity of the light spot, the exposure time, the translation speed and the duty cycle of the exposure rate.

Figure 7:
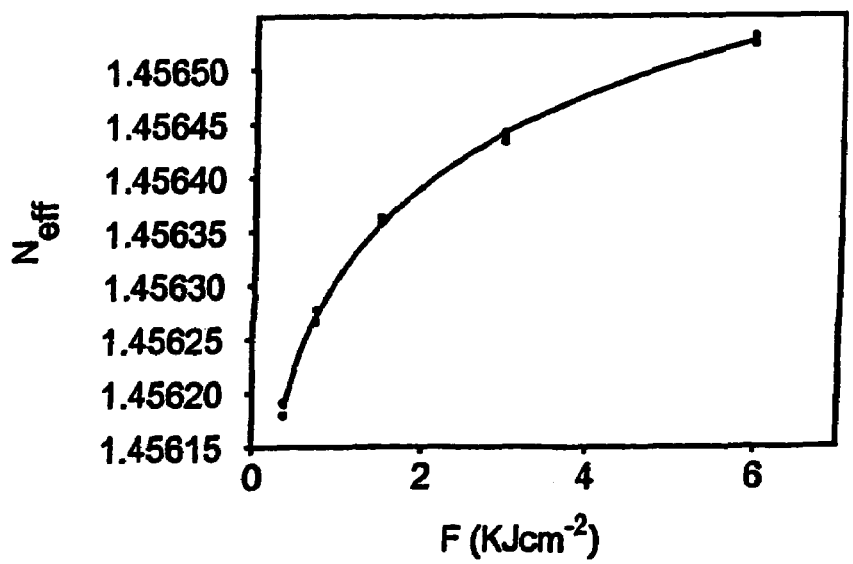
FIG. 7 shows the measured dependence of effective modal index on light spot exposure for a series of Bragg gratings fabricated in accordance with embodiments of the invention.

FIG. 7 is a graph showing the dependence of the effective modal index of various gratings on the fluence F of the light spots used to write them. As expected, greater fluence gives a higher effective modal index, but the relationship is not linear, because the photosensitivity eventually saturates.

Figure 8:
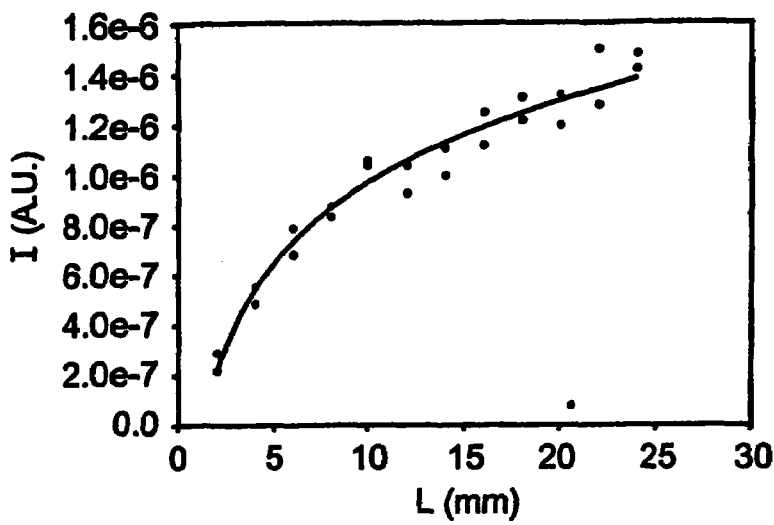
FIG. 8 shows the measured intensity of light reflected from a series of Bragg gratings of different length fabricated in accordance with embodiments of the invention.

The intensity of the signal reflected from a grating increases with grating length To demonstrate this effect, a number of gratings of varying length having the same grating period were written with a light spot of the same fluence. The results are shown in FIG. 8, as a graph of intensity of reflected signal I against grating length L.

Further Embodiments

Wavelength Detuning

The established technique of wavelength detuning, as used in the UV writing of gratings into optical fibres, can be applied to the present invention It allows different grating periods to be written for the same intersection angle used to generate the light spot, and is used in conjunction with the multiple successive exposures used to write Bragg gratings. In the method as described above, the exposures are carefully aligned so that the bright and dark fringes overlap with those of previous exposures. This is achieved by ensuring that the repetition rate, or period, of the exposures, for a given translation speed, is matched to the period of the interference pattern. However, if these two periods are deliberately unmatched (detuned), the overlapping is less exact, and the width and/or period of the grating planes is altered as each plane is written over many times with successive exposures. The technique can be used to create apodised and chirped gratings and gratings with arbitrary phase shifts, because the period within a grating can be varied in a known and continuous manner simply by modifying exposure rates and/or translation speeds.

In the context of the present invention, the technique also allows gratings of different period to be written on a single sample in one writing process. Furthermore, the use of a small circular light spot in embodiments of the present invention, compared to the elongated light pattern of prior art methods, allows a larger range of wavelengths to be written with a given fringe period, by detuning by changing the exposure repetition rate. An array of Bragg gratings having a wide range of peak reflectivities (approximately 1530 to 1580 nm) has been fabricated on a single chip using this technique Each grating was written using the same intersection angle between the two focussed beam used to generate the light spot.

Figure 9A:
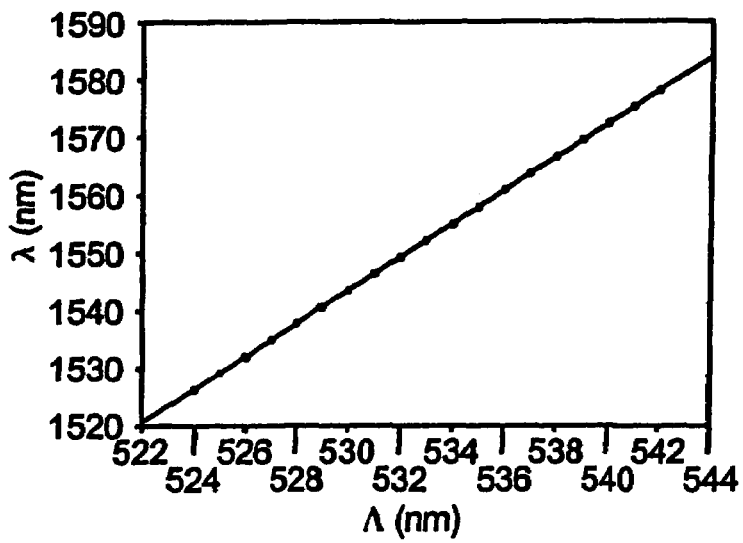
FIG. 9(a) shows the measured peak reflectivities of a series of Bragg gratings fabricated in accordance with embodiments of the invention employing wavelength detuning.

FIG. 9(a) shows the peak wavelength reflectivity responses λ of these gratings as a function of the grating period Λ.

Multiple Superimposed Gratings

Structures in which a single section of material is overwritten several times with Bragg gratings of different periods or characteristics have also been successfully demonstrated using embodiments of the invention. This is made possible by the use of the small light spot having dimensions corresponding to the grating widths, because accurate alignment with previously written gratings can be readily achieved. This is enhanced by the use of computer control of the translation stage and acousto-optic modulator. The sample can be accurately and repeatedly positioned correctly, so that the light spot can be precisely relocated to a previously written location. Wavelength detuning (by altering the exposure repetition rate) is used to modify the grating periods from grating to grating. Thus an entire complex structure can be simply and rapidly written in an automated manner. Use of an interferometrically generated light spot is particularly advantageous in this respect, because it avoids the need for alignment of a phase mask.

Multiple superimposed gratings can be used to create very short devices with a complex tailored spectral response, which are useful tools in the characterisation of the photosensitivity and refractive index change in UV exposed samples.

Figure 9B:
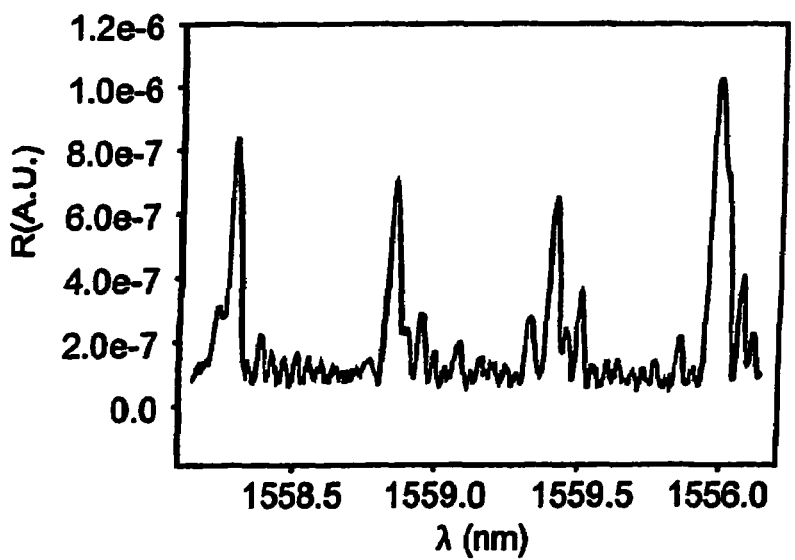
FIG. 9(b) shows the measured response of a series of superimposed Bragg gratings fabricated in accordance with an embodiment of the invention.

FIG. 9(b) shows the spectral response of a grating structure comprising four superimposed gratings fabricated using a method according to the present invention. The individual reflectivity peaks of the four gratings can clearly be seen, and the generally low level of reflected signal at intermediate wavelengths indicates the high accuracy of relative alignment of the gratings which was achieved.

Overwriting

In addition to multiple superimposed gratings as described above, embodiments of the present invention relate to the fabrication of other superimposed structures formed by overwriting previously written structures. For example, a weak uniform waveguide channel can be written first, using continuous exposure with a low intensity light spot. Then a stronger waveguide channel with integral grating structure can be written over the top, using suitable switching between continuous and pulsed exposure with a more intense light spot. This is advantageous if a light spot with zero intensity dark fringes is used, because the weak channel helps to define the waveguiding of the grating, by introducing a refractive index change into the low index grating planes. Alternatively, these stages can be reversed, and a second uniform channel can be written over a previously defined waveguide-and-grating structure. In any combination of overwriting, computer control of the translation stage gives repeatable sample positioning so that subsequent structures can be accurately aligned with existing structures. Also, the use of a single spot to perform all the writing results in channels and gratings with the same width, so that there is good overlap between the guided optical mode and the grating. This improves the efficiency of the grating(s).

Grating Spectral Responses

The examples presented above in the "Experimental Results" section related to gratings having a spectral response around 1500 nm However, the invention is not limited thereto, and can be used to write gratings operating at any wavelength within the optical transmission range of the sample material. As discussed, the grating period can be readily altered, either by changing the fringe period of the light spot (for example by changing the intersection angle of two interfering beams), or by using wavelength detuning. This allows gratings with a wide range of spectral responses to be written, including apodised and chirped gratings. In particular, gratings for the following applications are of interest:

1300 nm and 1550 nm gratings, for dense wavelength demultiplexing (DWDM) telecommunications applications, and for use as external wavelength lockers for semiconductor lasers at these wavelengths;

1480 nm or 980 nm gratings, for stabilisation of pump lasers for erbium-doped fibre amplifiers (EDFAs);

gratings as end mirrors for planar lasers or as phase shift reflectors for distributed feedback lasers, the lasers incorporating rare earth dopants, for example neodymium at 1060 nm or 1300 nm, erbium, erbium/ytterbium codoping, holmium, praseodymium;

gratings written into polymers or glass for use at the shorter telecommunications wavelength band (1300 nm) and the range 750 to 900 nm used for data-communications; and gratings as mirrors for other integrated optical devices such as planar Ti:sapphire lasers, planar optical parametric oscillators (OPOs).

Tilted Gratings

Tilted gratings are gratings in which the grating planes are arranged at an angle to the direction of the waveguiding channel, instead of the more usual perpendicular arrangement. This grating configuration means that light couples out into unguided modes, or cladding modes, and is not reflected back into the waveguide in the reverse direction. This is attractive, for example, for making transmission filters with low back-reflections. Also, the angle of tilt can control the direction in which light is emitted from waveguide, so that the grating can be used direct light. The angle by which the planes are shifted from the perpendicular can be as little as 1° or 2°, or up to about 45°.

Figure 9C:
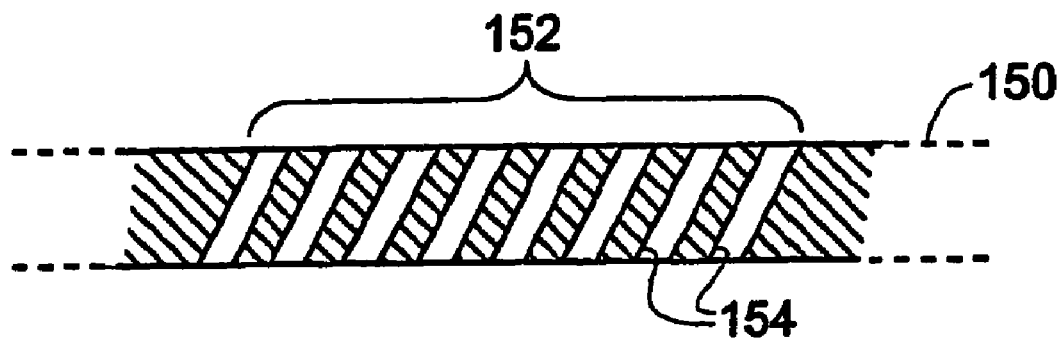
FIG. 9 shows a tilted Bragg grating written into a waveguide channel.
FIG. 9(d) shows a plan view of an arrangement suitable for writing a tilted Bragg grating in accordance with an embodiment of the invention.

FIG. 9(c) shows a schematic diagram of a tilted grating. A waveguiding channel 150 has a grating 152 defined within it The planes 154 of the grating 152 are not perpendicular to the length of the channel 150, but rather are arranged at an intermediate angle.

The present invention can be applied to the fabrication of tilted waveguide structures. By using an appropriate translation stage or stages, the sample can be translated at an angle to the k-vector of the writing pattern in the light spot while the light spot is pulsed or modulated to produce a grating structure.

Figure 9D:
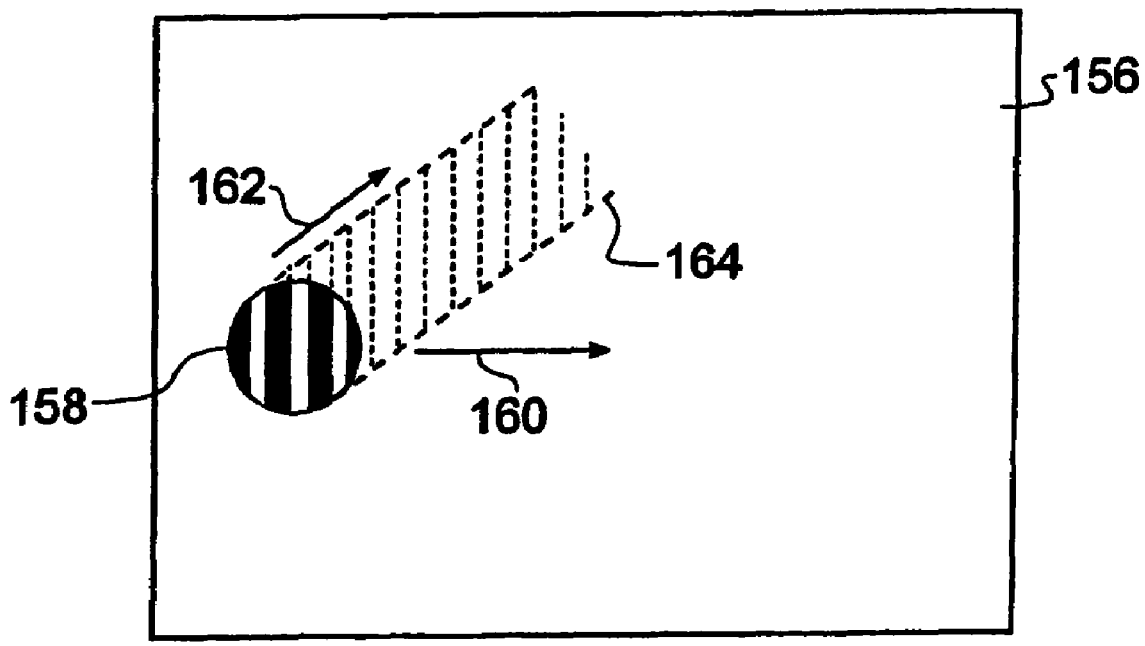

FIG. 9(d) shows a plan view of a sample 156 with a light spot 158 directed onto it. To create a conventional grating, the sample is translated along the direction shown by the arrow 60, which is perpendicular to the fringes in the light spot. This gives a grating with planes perpendicular to the longitudinal direction of the channel. However, if the sample is translated at some angle which is intermediate between perpendicular and parallel to the light spot fringes, as shown by the arrow 162, a tilted grating 164 will be created, as shown by dotted lines in the Figure.

Long Period Gratings

The methods of the present invention can also be used to write long period gratings, by using a light spot with a correspondingly large fringe period. Long period gratings are gratings with a longer than average grating period, typically 10 to 500 μm. Gratings of this type can be used to provide coupling to forward propagating cladding.

Two-dimensional Waveguiding Structures

A significant advantage of using a small generally circular light spot according to embodiments of the present invention is that two-dimensional waveguide channels can be readily written, because the small spot can accurately trace out a curved path. This is not possible with the elongated spots typically used in prior art grating writing techniques. Thus, a wide range of two-dimensional optical structures which were previously required to be implemented in a fibre format, or required complex and inaccurate techniques to be implemented as planar waveguide devices, can now be created in a compact planar format by the single step direct UV writing processes of the present invention.

To this end, a Mach-Zehnder-based structure has been fabricated, that comprises many of the building blocks required for a wide range of integrated optical structures and devices. These include straight channels, curved channels, s-bends, y-splitters and integrated Bragg gratings. In particular, the fabrication of complex arrays of integrated add-drop devices for wavelength division multiplexing and telecommunications systems is possible. Examples of such devices are Mach-Zehnder devices with gratings in two arms, null coupler based add-drop multiplexers with tilted gratings, and arrayed waveguide gratings. Additionally, hybrid devices may be made, in which some sections are fabricated using the present invention, and other sections using prior art techniques for defining waveguides and gratings. An example of such a hybrid device is one with a rare-earth based core combined with UV written gratings at each end which to act as mirrors.

A number of known planar waveguiding devices featuring these building blocks will now be described, to demonstrate the broad applicability of the invention. Various advantages are conferred by use of the methods described herein.

Figure 10:
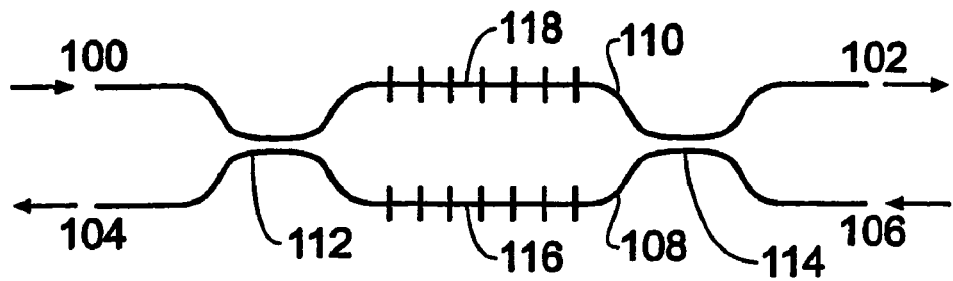
FIG. 10 shows a first example optical device suitable for fabrication by use of an embodiment of the present invention.

FIG. 10 is a schematic representation of a common device, the add-drop multiplexer utilising Mach-Zehnder interferometers. The device comprises a pair of waveguide channels 108, 110 coupled together at two points by a pair of 3 dB couplers 112, 114. The ends of the channels provide an input port 100, an output port 102, an add port 106 and a drop port 104. Each of the channels includes a Bragg grating, and the reflectivity of these gratings, together with the coupling, provides the add-drop functionality. A detailed description of such a device can be found in EP-A1-0909963 [5]. Use of the present invention allows far more precise writing of the channels and gratings than has possible using prior art fabrication techniques. This can eliminate the need for post-fabrication UV trimming such as is commonly employed in the prior art to improve the quality of imprecisely written structures.

Figure 11:
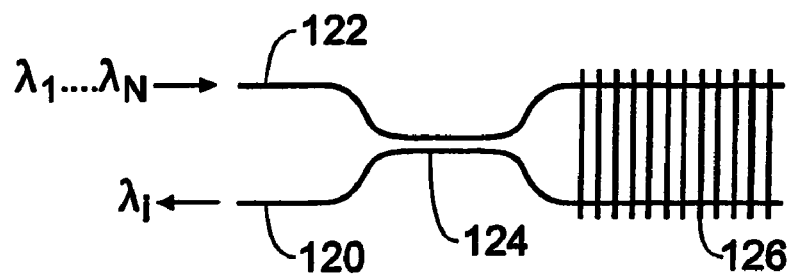
FIG. 11 shows a second example optical device suitable for fabrication by use of an embodiment of the present invention.

FIG. 11 shows a schematic representation of a simple waveguide filter comprising a Bragg grating. A pair of waveguide channels 120, 122 are coupled with a 3 dB coupler 124, and each has an integral Bragg grating 126. The figure shows a single grating extending across both channels, to indicate that each channel offers the same wavelength response. However, using the present invention, a pair of precisely matched gratings can be written simultaneously with each channel, because the same light spot and same exposure repetition rate can be used to write each grating, with no need for any intermediate adjustments that could produce mismatch in the grating responses. In use, a plurality of wavelengths $\lambda 1$ to $\lambda N$ enter one channel 122. The grating 126 reflects only one of the wavelengths $\lambda i$, which exits the filter along the other channel 120. This kind of device can be used to remove unwanted frequency components from outputs of integrated devices such as an AWG. US-B1-6229938 [6] describes such a device in more detail. Fabrication of the filter is expected to be easier, quicker and more accurate using the present invention.

Filters and multiplexers of the type described can be modified to allow the temperature of the grating to be altered, which tunes the spectral response. An example can be found in US-B1-6438293 [7]. Using the present invention, still greater flexibility and an improved filter response is provided by the ability to write very precise apodised and/or chirped integral gratings. The device response can thus be accurately tuned to the requirements of a specific application.

Figure 12:
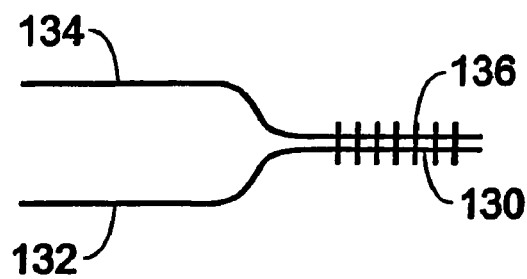
FIG. 12 shows a third example optical device suitable for fabrication by use of an embodiment of the present invention.

A further device that can advantageously be made according to methods of the present invention is a grating assisted coupler, such as that described in WO 02/44780 [8]. As shown in FIG. 12, this device comprises a coupling region 130 between two waveguide channels 132, 134, formed by arranging the channels 132, 134 in close proximity. A Bragg grating 136 is written across the coupling region 130. The period of the grating planes determines what wavelength can be coupled by the coupler. Once again, the device can be precisely, simply and quickly written.

Figure 13:
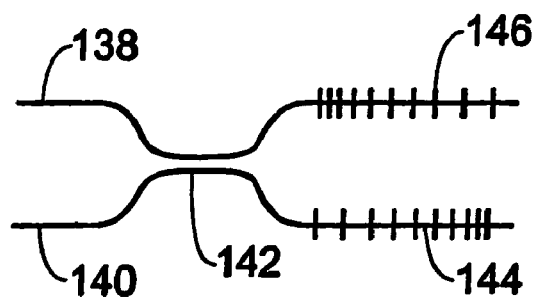
FIG. 13 shows a fourth example optical device suitable for fabrication by use of an embodiment of the present invention.

A more complex device is the optical FM to AM converter described in GB-A-2308461 [9]. This is illustrated in FIG. 13, and comprises a pair of waveguide channels 138 and 140 arranged to form a 3 dB coupler 142. After the coupler, each channel has an integral grating 144, 146; these are configured to be monotonically oppositely chirped. The ability to write precise gratings of any chirp by using the present invention makes it well-suited for fabrication of this device.

A further example of a device which can be fabricated to a high quality using the present invention is a two-wavelength add-drop multiplexer [10], because the device relies on very precise positioning of a grating.

Generation of the Light Spot

In the description thus far, the light spot has been presented as being a pattern containing a periodic intensity modulation in one direction generated by an interferometric process. However, a spot with a suitable pattern of light and dark fringes can alternatively be generated by imaging techniques. These alternatives will now be described in more detail.

Interferometric (or holographic) processes involve overlapping or intersecting at least two coherent laser beams in the region of the photosensitive region where the waveguide structure is to be induced. In the region of intersection an interference pattern with a period defined by the wavelength on the laser light and the intersection angle(s) is formed. The beams to be intersected can be created using any element which splits a single original beam into multiple beams. Refractive/reflective optics or dispersive components can be used.

Figure 14A:
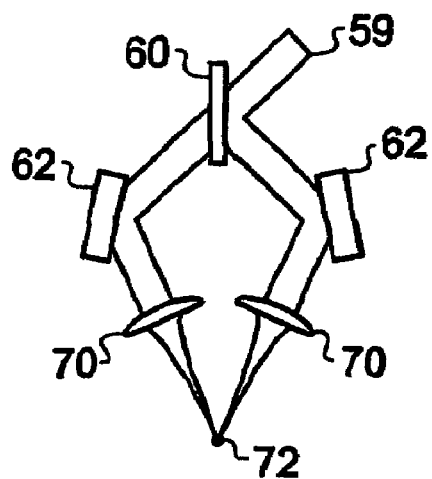
FIGS. 14(a),14(b) and 15 show two possible configurations for generating a light spot in accordance with embodiments of the invention.

FIG. 14(a) shows a schematic diagram of a first interferometric arrangement using reflective/refractive optics, in which a beam splitter 60 is used. An incoming light beam 59 is split in two by the beam splitter 60. The two beams are directed for intersection by mirrors 62, and focussed by lenses 70. The interferometric light spot 72 is thus a focussed spot formed where the two beams intersect. An advantage of using a beam splitter is that only two beams are created. However, the resultant beams are spatially inverted relative to each other and the effective path lengths are different due to one beam being refracted by the beam splitter and the other reflected. Both factors can be corrected by slight alterations of the subsequent beam paths.

Figure 14B:
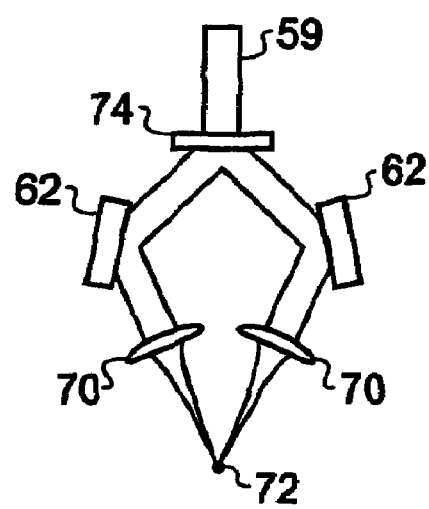

FIG. 14(b) shows a schematic diagram of a second interferometric arrangement using a dispersive component, in which a phase mask 74 is used to create multiple beams. In this case, the incoming beam 59 is diffracted by the phase mask 74 into $\pm1^{st}$ order diffacted beams. Mirrors 62 and lenses 70 are then used as before to intersect the beams and generate the light spot 72. The technique of using a phase mask in this way has the advantage that both beam paths have the same spatial profile and undergo the same effective path length. However, the phase mask also generates further beams as multiple diffraction orders (zeroth order, $\pm2^{nd}$ order, etc.). These waste beam power and can corrupt the intended interference pattern In either interferometric arrangement, focussing can be used to create a light spot of the desired dimensions. In the context of the present invention, this is a spot with a width equal to the desired waveguide channel width. The focussing can be realised by using independent lenses 62 for the separate beam paths as shown in FIGS. 14(a) and 14(b), or by focussing the incoming beam before splitting.

Figure 15:
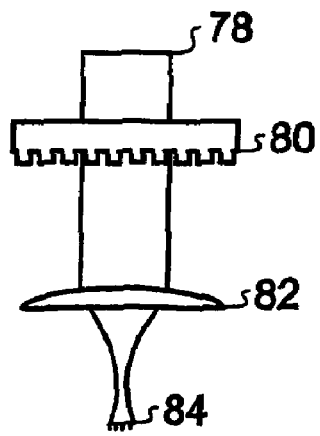

In contrast, imaging processes create a light spot by imaging a beam with the desired intra-spot fringe pattern onto the photosensitive region. The image can be of any structure that will give the desired pattern. For example a round light spot with several fringes can be formed by imaging a beam incident on a phase mask, which may include a magnification factor. FIG. 15 is a schematic diagram of apparatus used for imaging in this way. An incoming beam 78 is incident on a phase mask 80, which imprints the desired fringe pattern on the beam. The beam is then focussed using a lens 82, to give the desired light spot 84 at the focussed image plane. Alternatively, a single plane or fringe could be imaged and used to generate a grating by appropriate modulation of the beam to give multiple exposures. In general, however, an imaging arrangement will give a more limited depth of field than two interfering beams. Consequently, interferometric techniques are preferred.

Choice of UV Light Source

The wavelength of the UV light used to generate the light spot is determined by the photosensitive properties of the sample material. Also, depending on the intensity and the operating regime (cw or pulsed) of the light, gratings can be of Type I (low intensity) or Type II (high intensity).

For example, doping a glass matrix with the common photosensitising dopant germanium has the effect of producing a number of optical absorption bands at 180, 213, 240, 281, 325 and 517 nm. The strongest band is in the 240-250 nm region with a peak at 242 nm. The photosensitivity of the glass arises from bleaching of the absorption band by the UV light. The mechanism can be photochemical/photomechanical for cw light sources and photothermal for pulsed light sources.

In the first embodiment discussed above, a cw frequency-doubled argon ion laser operating at 244 nm is used to write in germanium-doped silica The suitability of the laser source in this case is determined by the following factors:

Proximity of the source wavelength to the peak of the germanium absorption band.
Good coherence length of the laser source, a requirement for generation of a good quality interferometric fringe pattern.
Good beam pointing stability.
Relatively inexpensive source.

Alternative suitable UV lasers are pulsed excimer-based sources such as KrF (248.5 nm), ArF (193 nm), $F_2$ (157 nm). Also, a pulsed excimer-pumped frequency-doubled dye laser or a pulsed frequency-doubled optical parametric oscillator can be considered. However, excimer lasers are relatively expensive and complicated sources. It is possible to excite a photosensitive reaction at 193 nm, and the mechanism is different from that at 244 nm. Also, the pulsed operation causes the writing of waveguides/gratings to be due to thermal damage (Type II). The coherence length of these sources is very small so they are better suited to imaging of the light spot through a phase mask than generating it interferometrically. However, they can be used with the interferometric technique if line narrowing is used to increase the coherence length.

In the context of the multiple exposures used to write the Bragg gratings, an advantage of the cw frequency-doubled argon laser is that the modulation of the beam can be done with a simple acousto-optic modulator (see FIG. 1). With pulsed lasers the synchronisation between the movement of the translation stage and the exposures of the light spot is more complex, because the laser repetition rate must be taken into account. As the pulsing rate may be of the order of 10 kHz, at practical writing speeds this means that any pulsed laser will need to operate at very high repetition rates. This may make laser sources such excimer lasers and frequency-quadrupled Q-switched Nd:YAG lasers unsuitable in some instances. However, ultra high repetition rate lasers, such as modelocked systems, are feasible, as the output appears quasi-cw in the circumstance of the present invention. Some other high repetition rate laser systems such as copper vapour may also be suitable.

Polarisation of the Light Spot

It is possible to modify a grating by controlling the polarisation of the light used to generate the light spot. When using a two-beam interference technique to generate the light spot, the polarisation of the two beams can be arranged so as to alter the electric field strength. For example, for two beams intersecting at 45° and having electric fields in the plane of intersection there is no vector sum of the electric field which is equal to zero, whereas if the electric fields are perpendicular to the plane of intersection, the vector sum can be zero. Thus, the strength of the fringes in the interference pattern can be varied, in turn varying the grating properties. This technique can be used to affect the grating strength and the birefringence of the waveguide.

Alignment of the Light Spot

To achieve precise and accurate grating and waveguide writing, the alignment of the light spot within the sample should be carefully controlled during writing to ensure that it remains in the photosensitive region, which may be of limited thickness and may not be flat. For example, wafers into which waveguides are written are commonly bowed slightly.

In prior art methods of direct UV writing of uniform waveguides a single beam is focused down into a spot. The precision of the position of the focal point relative to the photosensitive region has to be accurate to within the Rayleigh range of the focused beam. This is generally in excess of tens of micrometers.

Figure 16A:
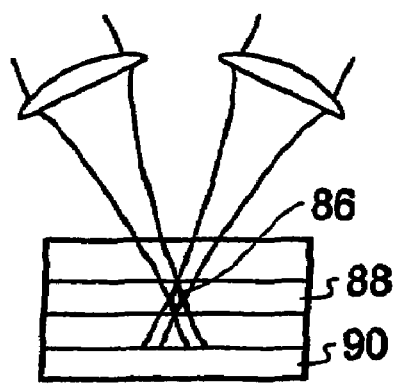
FIGS. 16(a) and 16(b) show a light spot generated in accordance with embodiments of the invention and correctly and incorrectly positioned in a sample of material.
Figure 16B:
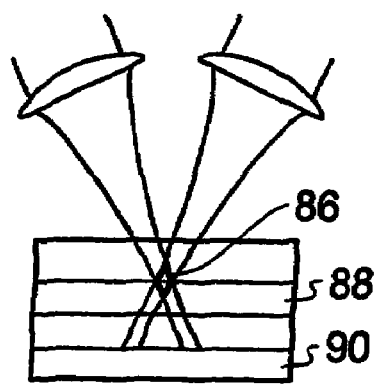

The positional tolerance for embodiments of the present invention is much reduced in comparison, for interferometric and for imaging techniques of generating the light spot. In the imaging process, any deviation of the position of the photosensitive region from the image plane will result in a loss of focus, and consequent loss of contrast of the grating structure. In the interferometric approach the "depth" of the region where the two focused beams cross is proportional to the size of the spots and inversely proportional to the sine of the intersection angle. For writing of gratings for telecommunications applications in silica, this gives a spot height of ~20 µm. If alignment of the light spot within the photosensitive region is out by as little as ~2 µm, fewer grating planes will be exposed in any one exposure. If the alignment is out by more than ~10 μm, areas of the photosensitive region will not be exposed at all. Thus correct positioning of the spot is important FIGS. 16(a) and 16(b) illustrate this point In FIG. 16(a), the light spot 86 is aligned with the center of the photosensitive layer 88 of the sample 90, so that the interferometric pattern is generated throughout the layer 88. In FIG. 16(b), the light spot 86 is centered slightly above the photosensitive layer 88 so that the interferometric pattern is only partly contained within the photosensitive layer 88, and only a partial grating will be written, in the top part of the layer 88 only.

Any sufficiently precise alignment technique can be used. An example of a passive alignment technique uses a high resolution levelling stage as the translation stage to support the sample, together with a level measurement system such as a mechanical dial gauge or a non-contact interferometric system operable to measure the height position of the top surface of the sample. A system of this type is suitable for samples in which the top layer is the photosensitive region, or samples in which the photosensitive region is always a fixed distance from the top surface. In either case, the alignment of the light spot can be maintained by keeping it at a fixed height relative to the measured height of the top surface of the wafer.

More versatile alignment methods are based on monitoring luminescence from the photosensitive region of the sample generated by an incident light spot at very low power. This allows samples with non-flat photosensitive regions to be levelled before writing. An example of such a method uses an active feedback system to monitor the height of the sample or the position of the photosensitive layer through sample florescence, to ensure that the sample is always at optimal alignment. This arrangement allows for large, non-flat samples to be optimally written, for example silica-on-silicon samples that suffer wafer bow resulting in a non-flat surface.

Deuterium or Hydrogen Loading

As mentioned previously, the photosensitivity of a germanosilicate composition can be enhanced by a factor of about 100 by using hydrogen ($H_2$) or deuterium ($D_2$) loading. The process of loading involves the diffusion of $H_2$ or $D_2$ into the silica matrix. Upon UV exposure the loaded species are incorporated into the glass and result in a significant increase in the relative value for UV induced refractive index.

The mechanism responsible for enhanced photosensitivity through $H_2/D_2$ loading can be explained as a two-step process. The supply of sufficient energy either photolytically or thermally to a germanium site within the silica matrix that has a hydrogen molecule in close proximity results in the formation of a SiOH silica matrix termination, and a corresponding germanium oxygen deficient center (GODC) [11]. The presence of enough hydrogen or deuterium within the germanosilicate matrix can therefore theoretically result in every germanium site becoming a GODC, with a resultant associated enhancement of germanium-dependent photosensitivity. The GODC within germanosilicate glasses, in particular the $Ge^{2+}$ defect that absorbs at 240 nm, are credited with causing UV photosensitivity within the glass. An additional enhancement mechanism has also been observed in which the presence of hydrogen or deuterium acts as a catalyst for photobleaching of GODCs, resulting in an increase of refractive index [12].

It is possible that a number of further mechanisms contribute to the photosensitivity enhancement observed for $H_2/D_2$ loading of germanosilicates, in much that same way as there are a number of possible mechanisms for the basic germanium-dependent photosensitivity. However, it is clear that enhanced photosensitivity gives an increase in the UV absorption during writing thus increasing the induced refractive index change, regardless of the mechanism responsible. In the context of the present invention, enhance photosensitivity is advantageous in that a greater refractive index change can be induced for a given light spot intensity. Thus, stronger gratings and channels can be written, and/or lower power optical sources can be used.

Thermal Locking

The process of thermal locking imparts a degree of stability to the enhancement of photosensitivity by hydrogen or deuterium loading. Gratings written in thermally locked samples typically behave with increased predictability and greater linearity with respect to writing parameters, than those in samples that are freshly loaded but not thermally locked.

The locking is achieved by placing the loaded sample in a high temperature oven for ~10 seconds. Temperatures in the range 1200 to 1400° C. have been found to give good results, but other temperatures may also be used. This process "locks" the deuterium or hydrogen into the silica matrix by inhibiting outdiffusion. Outdiffsion times are extended from minutes to months.

Materials

The methods according to the present invention are not limited to the germanium-doped silica discussed so far. They may also be used to write into a wide variety of materials, providing the materials can be made photosensitive. These include polymers; glasses; crystals; and semiconductors including single crystal, polycrystalline, and amorphous materials, and heterostructures.

It is necessary to define a photosensitive region in at least part of a sample into which a waveguide structure is to be written. Typically, this will comprise a buried layer of photosensitive material. Such a layer may be produced by methods such as: ion exchange, direct bonding, solid-state ion exchange following direct bonding, spinning of glass, epitaxy, sputter growth, flame hydrolysis deposition, and plasma enhanced chemical vapour deposition (PECVD).

An alternative to forming a distinct photosensitive region is the use of a bulk photosensitive sample of a material with a sufficiently small optical penetration depth that the material is only modified by UV exposure within a dimension of a few microns. The refractive index change, and hence the waveguide/grating, is thus confined to the surface layer of the sample. In such a case it is preferable that the effect not be predominantly thermal, as this may inhibit writing of a fine grating structure.

Regarding dopants used to provide photosensitivity, germanium doping of silica has been widely used. Co-doping with phosphorus and/or boron can also be considered. Additional dopant species such as tin, titanium, antimony, aluminium and nitrogen are also expected to enhance the UV photosensitivity of silica, either through increased absorption at the writing wavelength, or through the introduction of additional UV modifiable defects within the silica matrix.

Negative Photosensitive Materials

The preceding description has concentrated on materials having a positive photosensitivity, in which exposure to UV light produces an increase in refractive index. However, some materials undergo a reduction in refractive index when exposed to UV light [1]. This is relatively common in glasses, for example, due to photothermal expansion resulting in a lower density and hence lower index. Germanosilica typically shows a positive response, but at high levels of UV fluence the index can start to reduce.

The methods of the present invention can be applied to negative materials as well as positive materials. A Bragg grating can be written in the same way for both positive and negative materials. A uniform waveguiding channel, however, needs to have a higher index than the surrounding material. In a negative material, this can be achieved by writing a channel of reduced index on each side of the desired path of the waveguiding channel. A grating can then be written over the top.

CONCLUSION

A technique for the simultaneous definition of ultraviolet induced waveguides with Bragg gratings has been presented. Stable Bragg gratings have been directly UV written into photosensitive samples through the use of interference pattern stepping. It has been demonstrated that the period of the resultant Bragg grating is directly dependent on the period of superposition for subsequent interference pattern exposures during the writing process. The technique permits a significant reduction in process time and complexity when compared to the prior art dual stage processes of waveguiding fabrication and subsequent grating definition via a phase mask. The inherent flexibility of the present technique is advantageous in the design and realisation of complex optical structures and the development of integrated optical devices.

Features of some embodiments of the present invention are described in a publication by the inventors [13].

REFERENCES

[1] "Fiber Bragg Gratings", Raman Kashyap, Academic Press; ISBN: 0124005608; 1; st edition (May 15, 1999).

[2] "Low-threshold Nd-doped silica planar wave-guide laser", J R Bonar, J A Bebbington, J S Aitchison, G D Maxwell, B J Ainslie, ELECTRONICS LETTERS, Vol 30 (3): pp. 229-230, Feb. 3 1994.

[3] "Fiber Bragg grating technology fundamentals and overview", K O Hill, G Meltz, JOURNAL OF LIGHTWAVE TECHNOLOGY, Vol 15 (8): pp. 1263-10 1276, August 1997.

[4] "Directly UV written silica-on-silicon planar waveguides with low loss", M Svalgaard, M Kristensen, ELECTRONICS LETTERS, Vol 33 (10): pp. 61-863, May 8 1997.

[5] EP-A1-0909963

[6] US-B1-6229938

[7] US-B1-6438293

[8] WO 02/44780

[9] GB-A-2308461

[10] "Two-wavelength planar add/drop WDM filter employing a three-mode coupling Bragg grating", K W Gaff, F Ladouceur, J D Love, ELECTRONICS LETTERS Vol 36 (13): pp. 1142-1144, Jun. 22 2000.

[11] "Mechanisms of hydrogen-induced losses in silica based optical fibers", A Iino, M Kuwabara, K Kokura, JOURNAL OF LIGHTWAVE TECHNOLOGY, Vol. 8 (11): pp. 1675-1679, November 1990.

[12] "Effects of elevated-temperature hydrogen exposure on short-wavelength optical losses and defect concentrations in germanosilicate optical fibers", R M Atkins, P J Lemaire, JOURNAL OF APPLIED PHYSICS, Vol. 72 (2): pp. 344-348, Jul. 15 1992.

[13] "Fabrication of directly UV-Written channel waveguides with simultaneously defined integral Bragg gratings", G D Emmerson, S P Watts, C B E Gawith, V Albanis, M Ibsen, R B Williams, P G R Smith, ELECTRONICS LETTERS, Vol. 38 (24): pp. 1531-1532, Nov. 21 2002.

What is claimed is:

1. A method of writing a waveguiding channel of increased refractive index into a sample, the channel having a width and a path, the method comprising:
   providing a sample of material having a region which is photosensitive to light of a specific wavelength;
   generating a spot of light at the specific wavelength, the spot having a static periodic intensity pattern of high and low intensity fringes, and a width which is related to the width of the channel;
   positioning the spot within the photosensitive region; and
   causing relative movement between the sample and the light spot with its static periodic intensity pattern along the path of the channel to define the channel by exposing parts of the photosensitive region to the light spot to produce a change in refractive index; and
   wherein the light spot is generated from polarised light, the method further comprising controlling the polarisation of the light to modify the change in refractive index.

2. A method of writing a waveguiding channel of increased refractive index into a sample, the channel having a width and a path, the method comprising:
   providing a sample of material having a region which is photosensitive to light of a specific wavelength;
   generating a spot of light at the specific wavelength, the spot having a static periodic intensity pattern of high and low intensity fringes, and a width which is related to the width of the channel;
   positioning the spot within the photosensitive region; and
   causing relative movement between the sample and the light spot with its static periodic intensity pattern along the path of the channel to define the channel by exposing parts of the photosensitive region to the light spot to produce a change in refractive index; and
   wherein the relative movement is at a constant velocity and exposure to the light spot is continuous during the relative movement to produce a uniform change in refractive index.

3. A method of writing a waveguiding channel of increased refractive index into a sample, the channel having a width and a path, the method comprising:
   providing a sample of material having a region which is photosensitive to light of a specific wavelength;
   generating a spot of light at the specific wavelength, the spot having a static periodic intensity pattern of high and low intensity fringes, and a width which is related to the width of the channel;
   positioning the spot within the photosensitive region; and
   causing relative movement between the sample and the light spot with its static periodic intensity pattern along the path of the channel to define the channel by exposing parts of the photosensitive region to the light spot to produce a change in refractive index; and
   wherein exposure to the light spot is discontinuous during the relative movement to produce a periodic change in refractive index along the channel, the periodic increase defining a Bragg grating.

4. A method according to claim 3, in which the discontinuous exposure comprises a plurality of adjacent exposures along the path of the channel.

5. A method according to claim 4, in which the adjacent exposures overlap such that in each exposure at least one high intensity fringe in the light spot exposes a part of the photosensitive region already exposed to a high intensity fringe in a previous exposure.

6. A method according to claim 5, in which each adjacent exposure is offset from exact overlap so that resulting periodic increase in refractive index has a different period from the periodic intensity pattern of the light spot.

7. A method according to claim 6, in which the period of the periodic increase in refractive index varies so as to define a chirped or apodised Bragg grating or a Bragg grating containing arbitrary phase shifts.

8. A method according to claim 3, in which the relative movement is non-perpendicular to the periodic intensity pattern so as to define a tilted Bragg grating.

9. A method according to claim 3, in which the light spot is substantially circular.

10. A method according to claim 3, in which the light spot is generated by intersecting two beams of light at an angle to form an interference pattern.

11. A method according to claim 3, in which the light spot is generated by exposure through a phase mask.

12. A method according to claim 3, and further comprising subjecting the sample to a loading process to load hydrogen and/or deuterium into the photosensitive region, before exposure of the sample to the light spot.

13. A method according to claim 12, and further comprising, after the loading process, subjecting the sample to a thermal locking process to lock the hydrogen and/or deuterium into the photosensitive region, before exposure of the sample to the light spot.

14. A method according to claim 3, in which the path of the channel is substantially linear.

15. A method according to claim 3, in which the path of the channel comprises one or more curves.

16. A method according to claim 3, in which the path of the channel comprises two or more interconnecting portions.

17. A method according to claim 3, and further comprising repeating the positioning of the spot and the causing of relative movement so as to define one or more additional channels with paths substantially the same as the path of the said channel.

18. A method according to claim 3, in which the photosensitive region is loaded with hydrogen and/or deuterium to enhance the photosensitivity.

19. A method according to claim 18, in which the hydrogen and/or deuterium is locked into the sample.

20. A method of writing a waveguiding channel of increased refractive index into a sample, the channel having a width and a path, the method comprising:
   providing a sample of material having a region which is photosensitive to light of a specific wavelength;
   generating a spot of light at the specific wavelength, the spot having a static periodic intensity pattern of high and low intensity fringes, and a width which is related to the width of the channel;
   positioning the spot within the photosensitive region; and
   causing relative movement between the sample and the light spot with its static periodic intensity pattern along the path of the channel to define the channel by exposing parts of the photosensitive region to the light spot to produce a change in refractive index; and
   wherein the low intensity fringes of the light spot have an intensity greater than zero.

\* \* \* \* \*